(12) United States Patent
Yano et al.

(10) Patent No.: US 10,309,402 B2
(45) Date of Patent: Jun. 4, 2019

(54) OIL-FREE SCREW COMPRESSOR HAVING ATMOSPHERE OPEN HOLE FORMED IN CASING AND COMMUNICATION HOLE FORMED IN SHAFT SEAL DEVICE

(71) Applicant: Kobe Steel, Ltd., Hyogo (JP)

(72) Inventors: Yoshio Yano, Hyogo (JP); Toshiyuki Miyatake, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 150 days.

(21) Appl. No.: 15/513,830

(22) PCT Filed: Sep. 24, 2015

(86) PCT No.: PCT/JP2015/076916
§ 371 (c)(1),
(2) Date: Mar. 23, 2017

(87) PCT Pub. No.: WO2016/052297
PCT Pub. Date: Apr. 7, 2016

(65) Prior Publication Data
US 2017/0306959 A1     Oct. 26, 2017

(30) Foreign Application Priority Data

Sep. 29, 2014  (JP) ................................. 2014-198966

(51) Int. Cl.
*F01C 19/00*     (2006.01)
*F03C 2/00*      (2006.01)
(Continued)

(52) U.S. Cl.
CPC ............ *F04C 27/009* (2013.01); *F04B 39/00* (2013.01); *F04C 18/16* (2013.01); *F04C 27/00* (2013.01);
(Continued)

(58) Field of Classification Search
CPC .......... F04C 18/16; F04C 27/00; F04C 27/02; F04C 27/009; F04C 2220/12;
(Continued)

(56) References Cited

U.S. PATENT DOCUMENTS 4,487,563  A       12/1984  Mori et al.
8,435,020  B2 *     5/2013  Amano ................... F04C 18/16
                                                    418/201.1
(Continued)

FOREIGN PATENT DOCUMENTS

BE       1010821 A3 *  2/1999  ............ F04C 27/009
JP       S59-51190 A    3/1984
(Continued)

OTHER PUBLICATIONS

JP2002276574A—Yasunaka, Hideo—Shaft Seal Device of Oil-Free Screw Compressor—Sep. 25, 2002—English Translation. (Year: 2002).*

(Continued)

*Primary Examiner* — Theresa Trieu
(74) *Attorney, Agent, or Firm* — Studebaker & Brackett PC (57) ABSTRACT

An oil-free screw compressor includes: a casing having a rotor chamber; a bearing supporting rotary shafts of the screw rotors; a shaft seal device including an oil seal portion and an air seal portion; an atmosphere open hole formed in the shaft seal device; at least one communication hole formed in the rotary shaft; and an annular space communicating the atmosphere open hole with the at least one communication hole communicate with each other. The annular space includes an inner peripheral annular space formed on an inner peripheral side of the casing. Assuming an open cross-sectional area of the inner peripheral annular
(Continued)

space as S1, a total open cross-sectional area of the communication holes as S2, an open cross-sectional area of the i-th communication hole out of the communication holes as S2i, and the number of communication holes as n (n being a natural number of 1 or more), a following relationship is satisfied.

$$S1 \geq S2 = \sum_{i=1}^{n} S2i$$

11 Claims, 6 Drawing Sheets

(51) Int. Cl.
  *F03C 4/00* (2006.01)
  *F04C 27/00* (2006.01)
  *F04B 39/00* (2006.01)
  *F04C 18/16* (2006.01)
  *F16J 15/40* (2006.01)
  *F04C 27/02* (2006.01)
  *F16J 15/44* (2006.01)

(52) U.S. Cl.
  CPC ............... *F04C 27/02* (2013.01); *F16J 15/40* (2013.01); *F16J 15/441* (2013.01); *F04C 2220/12* (2013.01); *F04C 2230/21* (2013.01); *F04C 2240/30* (2013.01); *F04C 2240/50* (2013.01); *F04C 2240/60* (2013.01)

(58) Field of Classification Search
  CPC ............... F04C 2230/21; F04C 2240/30; F04C 2240/50; F04C 2240/60; F04B 39/00; F16J 15/441; F16J 15/40
  USPC ................. 418/97–99, 102, 104, 141, 201.1; 277/351, 412, 431, 432, 927
  See application file for complete search history.

(56) References Cited

U.S. PATENT DOCUMENTS

2008/0240964 A1* 10/2008 Kimura ............... F04C 27/009
                                                418/104
2010/0253005 A1* 10/2010 Liarakos ............ F16J 15/3526
                                                277/353

FOREIGN PATENT DOCUMENTS

| JP | H03-110138 U1 | 11/1991 |
| JP | 2002-276574 A | 9/2002 |
| JP | 2011-256828 A | 12/2011 |

OTHER PUBLICATIONS

International Search Report issued in PCT/JP2015/076916; dated Dec. 15, 2015.
Written Opinion issued in PCT/JP2015/076916; dated Dec. 15, 2015.
Notification of Transmittal of Translation of the International Preliminary Report on Patentability and Translation of Written Opinion of the International Searching Authority; PCT/JP2015/076916; dated Apr. 13, 2017.

* cited by examiner

Fig.6

OIL-FREE SCREW COMPRESSOR HAVING ATMOSPHERE OPEN HOLE FORMED IN CASING AND COMMUNICATION HOLE FORMED IN SHAFT SEAL DEVICE

CROSS-REFERENCE TO RELATED APPLICATIONS

This is a national phase application in the United States of International Patent Application No. PCT/JP2015/076916 with an international filing date of Sep. 24, 2015, which claims priority of Japanese Patent Application No. 2014-198966 filed on Sep. 29, 2014 the contents of which are incorporated herein by reference.

TECHNICAL FIELD

The present invention relates to an oil-free screw compressor.

BACKGROUND ART

In the oil-free screw compressor, air is compressed by a pair of male and female screw rotors which is rotatable in an oil no-supply state and in a non-contact state. In the oil-free screw compressor, there may be a case where compressed air produced in a rotor chamber is leaked along a rotary shaft or a lubricant supplied to a gear which drives the rotary shaft or a bearing which supports the rotary shaft flows into the rotor chamber. To prevent such drawbacks, a shaft seal device is disposed between the rotor chamber and the bearing. The shaft seal device includes: an air seal portion which seals compressed air from the rotor chamber; and an oil seal portion which seals a lubricant from the bearing.

When the rotor chamber is brought into a negative pressure state during an unloading operation, there may be a case where a lubricant which is supplied to the bearing or the like flows into the inside of the rotor chamber after passing through the oil seal portion although an amount of the lubricant is insignificant. To prevent such flowing in of the lubricant into the inside of the rotor chamber, an atmosphere open passage is provided for making an air ventilation gap formed on a rotor-chamber-side end portion of the oil seal portion and an atmosphere side of a casing communicate with each other. When the rotor chamber is brought into a negative pressure state, atmospheric air is introduced into the ventilation gap through the atmosphere open passage thus preventing the lubricant from flowing into the rotor chamber.

The oil-free screw compressor provided with the above-mentioned shaft seal device is disclosed in JP 2011-256828A and JP 59-51190A, for example.

SUMMARY OF THE INVENTION

Problems to be Solved by the Invention

In an oil-free screw compressor disclosed in JP 2011-256828A, a seal box portion formed between an air seal and a visco-seal or a communication hole of a seal box communicates with an atmosphere open hole formed in a casing. With such a configuration, the flowing in of a lubricant into a rotor chamber is prevented. In the oil-free screw compressor disclosed in JP 59-51190A, a plurality of small holes disposed between a fixed-type screw seal and a gas-use shaft seal device communicate with an atmosphere open hole formed in a casing. All of the atmosphere open holes, the communication holes and the small holes described in the above-mentioned two prior arts are formed for preventing a lubricant from flowing into a rotor chamber when the rotor chamber is brought into a negative pressure during an unloading operation.

However, in JP 2011-256828A, an annular space having a groove shape is formed on an outer peripheral surface of the shaft seal device and hence, when an open cross-sectional area of the annular space is small, a pressure loss is generated. Further, in JP 2011-256828A, an O-ring is disposed on both an air seal and a visco-seal of the shaft seal device, and the communication holes and the annular space having a groove shape are formed between such two O-rings. With such a configuration, a space in the shaft seal device in the axial direction is restricted by two O-rings and hence, it is difficult to properly ensure a width of the annular space in the axial direction. Accordingly, it is difficult to property cope with the lowering of a pressure loss with the use of the annular space formed in the shaft seal device disclosed in JP 2011-256828A.

In the same manner as JP 2011-256828A, also in JP 59-51190A, an annular space which is formed on an outer peripheral surface of a shaft portion is disclosed. In a cross-sectional view which shows the fixed-type screw seal in JP 59-51190A, a plurality of communication holes are formed in the fixed-type screw seal. In the fixed-type screw seal shown in the drawing, an open cross-sectional area of one communication hole is set substantially as large as an open cross-sectional area of the annular space, and a plurality of communication holes are formed. With such a configuration, a total open cross-sectional area of the communication holes becomes larger than the open cross-sectional area of the annular space by an amount corresponding to the number of communication holes approximately. Accordingly, also in JP 59-51190A, a large pressure loss is generated in the annular space rather than in the plurality of communication holes.

In this manner, in both of the oil-free screw compressors disclosed in JP 2011-256828A and JP 59-51190A, a large pressure loss is generated at the position of the annular space which makes the atmosphere open hole and the communication hole communicate with each other and hence, there is a possibility that an action of preventing flowing-in of a lubricant to the rotor chamber does not sufficiently function during an unloading operation. Nevertheless, neither one of JP 2011-256828A nor JP 59-51190A has taken this point into particular consideration.

Accordingly, it is an object of the present invention to provide an oil-free screw compressor which can prevent flowing-in of a lubricant during an unloading operation by reducing a pressure loss in an annular space which makes an atmosphere open hole and a communication hole communicate with each other as much as possible.

Means for Solving the Problems

To solve the above-mentioned technical problems, according to the present invention, an oil-free screw compressor having the following configurations is provided.

That is, an oil-free screw compressor includes: a pair of female and male screw rotors which meshes with each other in a non-contact manner; a casing having a rotor chamber in which the screw rotors are housed; a bearing which supports rotary shafts of the screw rotors; a shaft seal device which includes an oil seal portion disposed on a bearing side and an air seal portion disposed on a rotor chamber side and shaft-seals the rotary shafts; an atmosphere open hole which is formed in the casing; at least one communication hole which is formed in the shaft seal device in a state where the communication hole is positioned between the oil seal portion and the air seal portion; and an annular space which makes the atmosphere open hole and the at least one communication hole communicate with each other, wherein the annular space includes an inner peripheral annular space annularly formed on an inner peripheral side of the casing, and wherein assuming an open cross-sectional area of the inner peripheral annular space in a partial cross section taken along an axial direction of the rotary shaft as S1, assuming a total open cross-sectional areas of the communication holes as S2, and assuming an open cross-sectional area of the i-th communication hole out of the communication holes as S2i, and assuming the number of communication holes as n (n being a natural number of 1 or more), a following relationship is satisfied.

$$S1 \geq S2 = \sum_{i=1}^{n} S2i$$

With the above-mentioned configuration, the inner peripheral annular space which forms the annular space is formed on a casing side and hence, it is possible to alleviate the restriction imposed to ensure a width of the opening portion of the inner peripheral annular space in the axial direction of the rotary shaft. Accordingly, the open cross-sectional area S1 of the inner peripheral annular space can be increased compared to the case where the annular space is formed on a shaft seal device side. As a result, the following relationship is easily satisfied.

$$S1 \geq S2 = \sum_{i=1}^{n} S2i$$

Accordingly, a pressure loss in the annular space can be lowered and hence, it is possible to prevent flowing-in of a lubricant during an unloading operation.

MODE FOR CARRYING OUT THE INVETION

An oil-free screw compressor 1 according to a first embodiment of the present invention is described with reference to FIGS. 1 to 3. First, the schematic configuration of the oil-free screw compressor 1 according to the first embodiment is described in detail with reference to FIG. 1.

In the oil-free screw compressor 1, a pair of male and female screw rotors 16 which meshes with each other is housed in a rotor chamber 15 formed in a casing 12. The casing 12 is, for example, formed of a casing body, a discharge-side casing portion, and a suction-side casing portion.

The casing 12 has: a suction port 17 through which air which is an object to be compressed is supplied to the rotor chamber 15; and a discharge port 18 through which compressed air compressed by the screw rotors 16 in the rotor chamber 15 is discharged. A rotary shaft 21 is formed on respective end portions of the screw rotor 16 on a discharge side and a suction side. A drive gear 28 and a timing gear 27, which separate from each other, are mounted on the respective end portions of the rotary shafts 21 on the discharge side and the suction side. A rotational drive force of a motor not shown in the drawing is transmitted to one screw rotor 16 by way of the drive gear 28. The rotational drive force transmitted to one screw rotor 16 is transmitted to the other screw rotor 16 by way of the timing gear 27. Due to the rotation of the pair of screw rotors 16 in a non-contact state and also in a state where the screw rotors 16 mesh with each other, air is sucked in through the suction port 17. Air sucked in through the suction port 17 is compressed to a predetermined pressure, and compressed air is discharged from the discharge port 18.

On a discharge side of the casing 12, a shaft seal device loading space 10 on a discharge side is formed. In the shaft seal device loading space 10 on a discharge side, ball bearings (angular ball bearings in two rows) 19 and a bearing (roller bearing) 22 which rotatably support the rotary shaft 21 on a discharge side and a shaft seal device 20 on a discharge side are loaded. Also on a suction side of the casing 12, a shaft seal device loading space 10 on a suction side is formed. In the shaft seal device loading space 10 on a suction side, a bearing (roller bearing) 22 which rotatably supports the rotary shaft 21 on a suction side and a shaft seal device 20 on a suction side are loaded.

An atmosphere open hole 24a which connects the outside (atmosphere side) and an inner peripheral side of the casing 12 and communicates with an atmosphere is formed in the casing 12. An oil supply hole 26 for supplying a lubricant to the bearings 19, 22 and the timing gear 27 is formed in the casing 12.

The shaft seal devices 20 loaded in the shaft seal device loading spaces 10 on a discharge side and a suction side are formed substantially in symmetry with respect to the rotor chamber 15. Hereinafter, the shaft seal device 20 on a discharge side and an area around the shaft seal device 20 are described in detail with reference to FIGS. 2 and 3.

Figure 1:
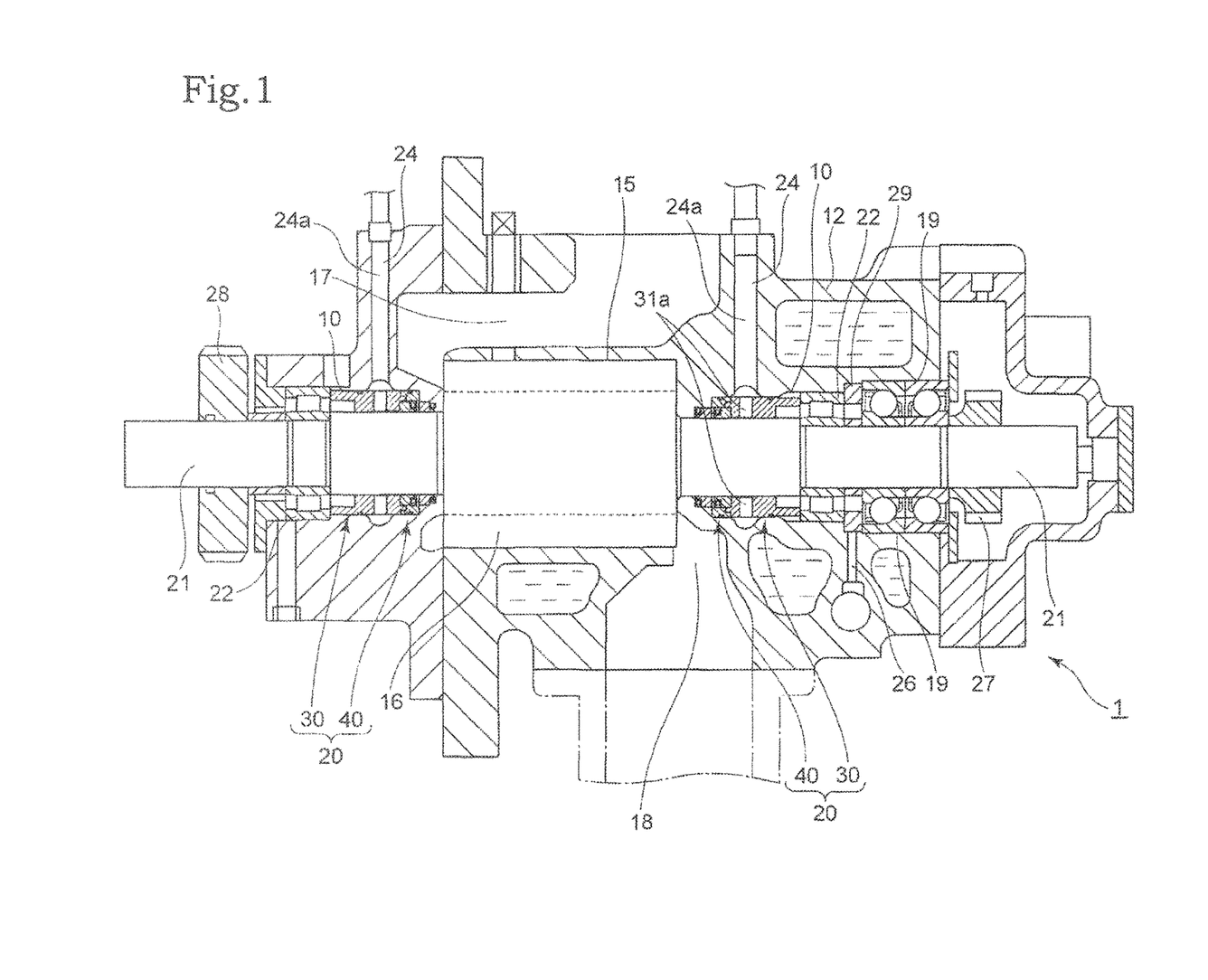
FIG. 1 is a longitudinal cross-sectional view showing the schematic configuration of an oil-free screw compressor according to a first embodiment of the present invention.
Figure 2:
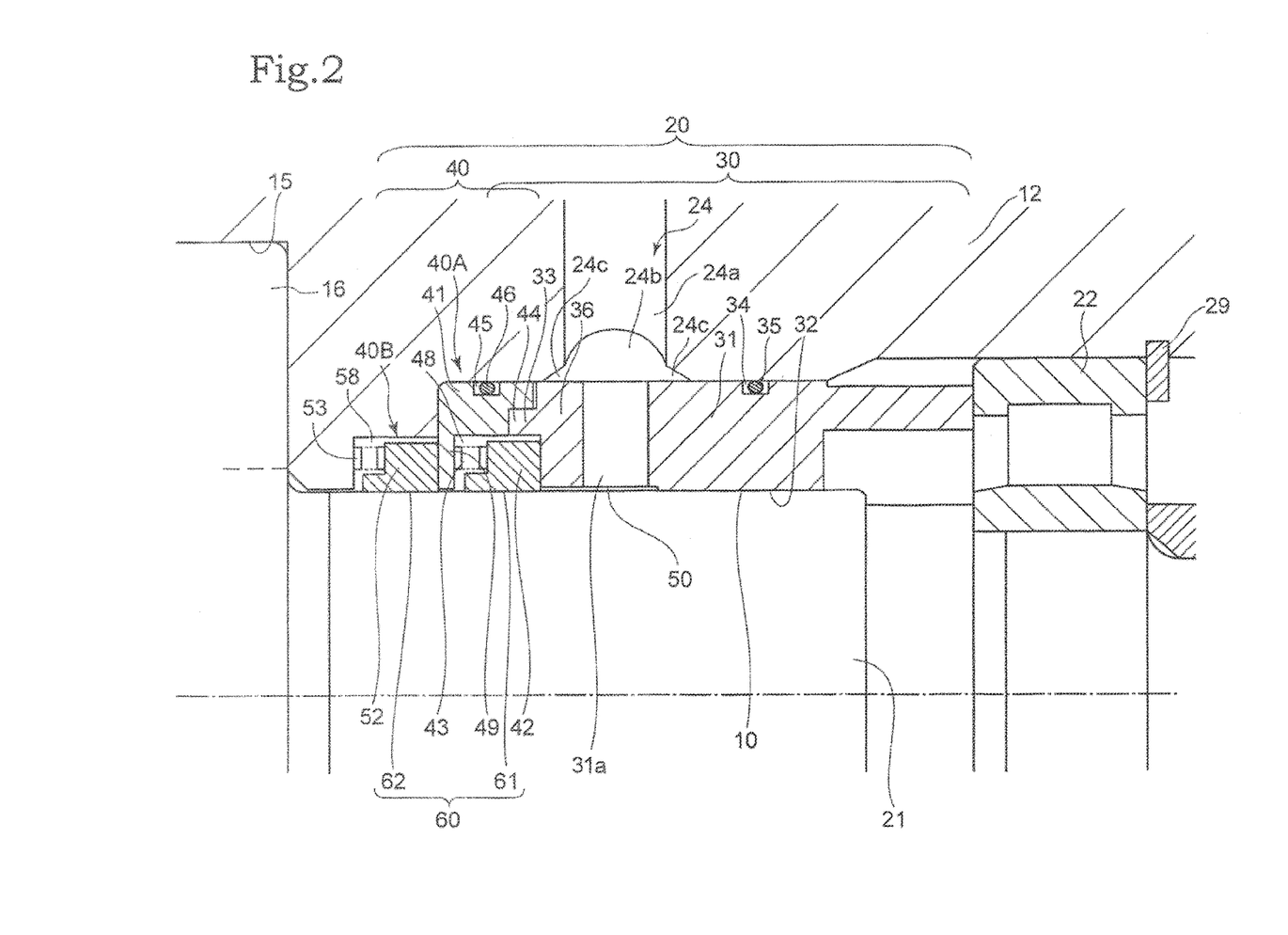
FIG. 2 is a partial cross-sectional view showing a shaft seal device and an area around the shaft seal device in the oil-free screw compressor shown in FIG. 1.

FIG. 2 is a partial cross-sectional view of the shaft seal device 20 on a discharge side and the area around the shaft seal device 20 in the oil-free screw compressor 1 shown in FIG. 1.

The bearing 22, a first shaft seal portion 30 which seals a lubricant, and a second shaft seal portion 40 which seals compressed air are loaded in the shaft seal device loading space 10 in order from a bearing 22 side to a rotor chamber 15 side. An end portion of the bearing 22 loaded in the shaft seal device loading space 10 on a side opposite to the rotor chamber 15 is restricted by a stopper 29. The first shaft seal portion 30 and the second shaft seal portion 40 are integrally connected to each other due to the fitting structure described later so that the shaft seal device 20 is formed.

To facilitate detachable assembling of the shaft seal device 20 in the shaft seal device loading space 10, a clearance slightly larger than loose fit (JIS B 0401) is formed between the shaft seal device loading space 10 and the shaft seal device 20. When a clearance slightly larger than a loose fit is formed, shaft seal ability is sacrificed. Accordingly, an O-ring 35 is disposed between an oil seal 31 and the casing 12 and an O-ring 46 is disposed between a packing case 41 and the casing 12. As a matter of course, a size of the clearance is set within a range where the O-rings 35, 46 can exhibit shaft seal ability. It is preferable that the O-rings 35, 46 be disposed separately such that the O-ring 35 is disposed in a recessed portion (annular groove) 34 of the oil seal 31 and the O-ring 46 is disposed in a recessed portion (annular groove) 45 of the packing case 41. The recessed portion (annular groove) 34 of the oil seal 31 and the recessed portion (annular groove) 45 of the packing case 41 are formed on outer peripheral surfaces of the oil seal 31 and the packing case 41 along a circumferential direction respectively. Due to the provision of the O-ring 35 of the oil seal 31 and the O-ring 46 of the packing case 41, leakage of compressed air between the casing 12 and the first shaft seal portion 30 and leakage of compressed air between the casing 12 and the second shaft seal portion 40 can be prevented respectively.

In a portion of the casing 12 which is disposed between a position corresponding to the O-ring 35 and a position corresponding to the O-ring 46 and opposedly faces the oil seal 31, the atmosphere open hole 24a is formed. The atmosphere open hole 24a penetrates the casing 12, and makes the shaft seal device loading space 10 and the outside (atmosphere side) of the casing 12 communicate with each other.

The first shaft seal portion 30 is formed of the non-contact oil seal 31 having an oil seal portion 32. The oil seal portion 32 is, for example, the visco-seal 32 where a spiral groove is formed on an inner peripheral surface of the oil seal 31. When the rotary shaft 21 is rotated, the visco-seal 32 generates a pumping action due to viscosity of air existing between an inner peripheral surface of the visco-seal 32 and an outer peripheral surface of the rotary shaft 21. Since a lubricant is pushed toward the bearing 22 due to a pumping action, the flowing out of the lubricant in a direction toward the rotor chamber 15 can be prevented. The spiral groove of the visco-seal 32 is not illustrated in the drawing. Since the spiral groove of the visco-seal 32 is formed on the inner peripheral surface of the oil seal 31, the oil seal 31 is made of a metal material which enables easy cutting of the oil seal 31.

On an end portion 36 of the oil seal 31 on a rotor chamber 15 side, a fitting projecting end portion 33 which projects toward a rotor chamber 15 side and has a cylindrical outer peripheral surface is formed. The fitting projecting end portion 33 is formed such that the fitting projecting end portion 33 is fitted in a fitting recessed end portion 44 of the packing case 41 described later by tight fit (JIS B 0401) or transition fit (JIS B 0401). The oil seal 31 and the packing case 41 are integrally connected to each other by the fitting structure. A gap between the fitting recessed end portion 44 and the fitting projecting end portion 33 is extremely small so that it is regarded that the gap does not exist in effect between the fitting recessed end portion 44 and the fitting projecting end portion 33. Accordingly, leakage of compressed air from the gap can be prevented.

The second shaft seal portion 40 includes: a first air seal 40A disposed on a bearing 22 side; and a second air seal 40B disposed on a rotor chamber 15 side.

The first air seal 40A is formed of a packing case 41, a non-contact seal ring 42, and a resilient body 43. A projecting portion 49 which projects toward the inside in a radial direction is formed on an end portion of the packing case 41 on a rotor chamber 15 side. A cylindrical seal ring accommodating space 48 is formed between the end portion 36 of the oil seal 31 and the projecting portion 49 of the packing case 41. In the seal ring accommodating space 48, the resilient body 43, and the seal ring 42 which is supported by the resilient body 44 in such a manner that the seal ring 42 is biased in an axial direction of the rotary shaft 21 (a direction of the bearing 22 in this embodiment) are accommodated. A size of the seal ring 42 is set such that an inner diameter of the seal ring 42 is slightly larger than an outer diameter of the rotary shaft 21. The seal ring 42 is formed, for example, using a material equal to a material for forming the rotary shaft 21 (for example, stainless steel) as a base material, and a film having a small friction coefficient is applied to a surface of the base material by coating. The resilient body 43 is a metal resilient member (for example, wave spring, wave washer, a compression coil spring or the like).

The seal ring 42 resiliently supported by the resilient body 43 can move in a radial direction even when the rotary shaft 21 is deflected. A first air seal portion 61 of the second shaft seal portion 40 is formed between an inner peripheral surface of the seal ring 42 and an outer peripheral surface of the rotary shaft 21. A large pressure loss is generated when compressed air passes through the fine gap of the first air seal portion 61 and hence, leakage of compressed air can be suppressed.

The second air seal 40B is disposed on a rotor chamber 15 side of the first air seal 40A. The second air seal 40B is formed of a non-contact seal ring 52 and the resilient body 53. A gas seal accommodating space 58 is formed at an end portion of the shaft seal device loading space 10 in the casing 12 on a rotor chamber 15 side. The resilient body 43 and the seal ring 52 supported by the resilient body 53 in a state where the seal ring 52 is biased by the resilient body 53 in an axial direction of the rotary shaft 21 (a direction of the bearing 22 in this embodiment) are accommodated in the gas seal accommodating space 58. The gas seal accommodating space 58 has a cylindrical shape having an inner diameter size smaller than that of the first air seal 40A.

The seal ring 52 also can move in a radial direction, and a second air seal portion 62 is formed between an inner peripheral surface of the seal ring 52 and an outer peripheral surface of the rotary shaft 21. A large pressure loss is generated when compressed air passes through the fine gap of the second air seal portion 62 and hence, leakage of compressed air can be suppressed.

The second shaft seal portion 40 includes the second air seal 40B in addition to the first air seal 40A. With such a configuration, shaft seal ability of the second shaft seal portion 40 is enhanced. In the first air seal 40A and the second air seal 40B, by using the same seal ring for forming the seal rings 42, 52 and by using the same resilient body for forming the resilient bodies 43, 53, the reduction of cost can be realized.

Next, an inner peripheral annular space 24g which makes the atmosphere open hole 24a and the communication holes 31a communicate with each other is described with reference to FIG. 3.

On an inner peripheral side of the casing 12, an inner peripheral annular groove 24b is formed such that the inner peripheral annular groove 24b overlaps with an inner end portion of the atmosphere open hole 24a. The inner peripheral annular groove 24b forms a part of the inner peripheral annular space 24g. The inner peripheral annular groove 24b is an annular groove formed on an inner peripheral surface of the casing 12 along a circumferential direction. The inner peripheral annular groove 24b has, for example, an approximately semicircular shape in a partial cross section taken along the axial direction of the rotary shaft 21.

A tapered expanding portion 24c on a rotor chamber 15 side is formed on a rotor chamber 15 side of the inner peripheral annular groove 24b in the axial direction of the rotary shaft 21. A tapered expanding portion 24c on a bearing 22 side is formed on a bearing 22 side of the inner peripheral annular groove 24b (hereinafter, the tapered expanding portions 24c on the rotor chamber 15 side and the bearing 22 side being simply referred to as tapered expanding portions 24c disposed on both sides). The tapered expanding portions 24c disposed on both sides are formed by chamfering both end portions of the inner peripheral annular groove 24b in the axial direction of the rotary shaft 21 in a C-surface shape or an R-surface shape. In the tapered expanding portions 24c disposed on both sides, the respective end portions project in a tapered shape toward a rotor chamber 15 side and a bearing 22 side. The tapered expanding portions 24c which are disposed on both sides of the inner peripheral annular groove 24b and are chamfered in a C-surface shape are formed in an approximately right triangular shape in a partial cross section taken along the axial direction of the rotary shaft 21. In FIG. 3, the inner peripheral annular space 24g which has the inner peripheral annular groove 24b and the tapered expanding portions 24c disposed on both sides is formed in the casing 12. An annular space 25 according to the first embodiment is formed of the inner peripheral annular space 24g. The inner peripheral annular space 24g is a space which surrounds the shaft seal device 20 in the circumferential direction (corresponding to "annular space" described in claims) 25. The inner peripheral annular space 24g communicates with the atmosphere open hole 24a and hence, the inner peripheral annular space 24g is opened in atmosphere.

Sizes of the tapered expanding portions 24c disposed on both sides of the inner peripheral annular groove 24b are set by taking into account projecting heights of the O-rings 35, 46 disposed in the recessed portion 34 of the oil seal 31 and the recessed portion 45 of the packing case 41, respectively. That is, the sizes of the tapered expanding portions 24c disposed on both sides of the inner peripheral annular groove 24b are set such that the O-rings 35, 46 disposed in the recessed portions 34, 45 of the shaft seal device 20 are not damaged at the time of loading the shaft seal device 20 in the shaft seal device loading space 10 or at the time of unloading the shaft seal device 20 from the shaft seal device loading space 10. An inclination angle θ of an inclined surface of each of the tapered expanding portions 24c disposed on both sides of the inner peripheral annular groove 24b which are chamfered in a C-surface shape with respect to an axial direction of the rotary shaft 21 is set to 30 degrees to 45 degrees, for example. A height H of each of the tapered expanding portions 24c disposed on both sides of the inner peripheral annular groove 24b which are chamfered in a C-surface shape with respect to an outer peripheral surface of the shaft seal device 20 is set to 1 mm or more, for example.

On the other hand, in the oil seal 31 of the shaft seal device 20, at least one (usually, a plurality of) communication hole (communication holes) 31a is/are formed. The communication holes 31a penetrate the oil seal 31 in a radial direction. Although the shape of the communication hole 31a is not limited, for example, the communication hole 31a is a round hole having a circular opening cross section in a direction perpendicular to a length of the communication hole 31a. With respect to the communication holes 31a which do not limit the present invention, for example, four communication holes 31a are disposed at equal intervals in the circumferential direction at an angle of 90 degrees.

The respective communication holes 31a communicate with the atmosphere open hole 24a through the inner peripheral annular space 24g formed in the casing 12. Accordingly, the communication holes 31a on a shaft seal device 20 side, and the inner peripheral annular space 24g and the atmosphere open hole 24a on a casing 12 side communicate with an atmosphere thus forming the atmosphere open passage 24.

Figure 3:
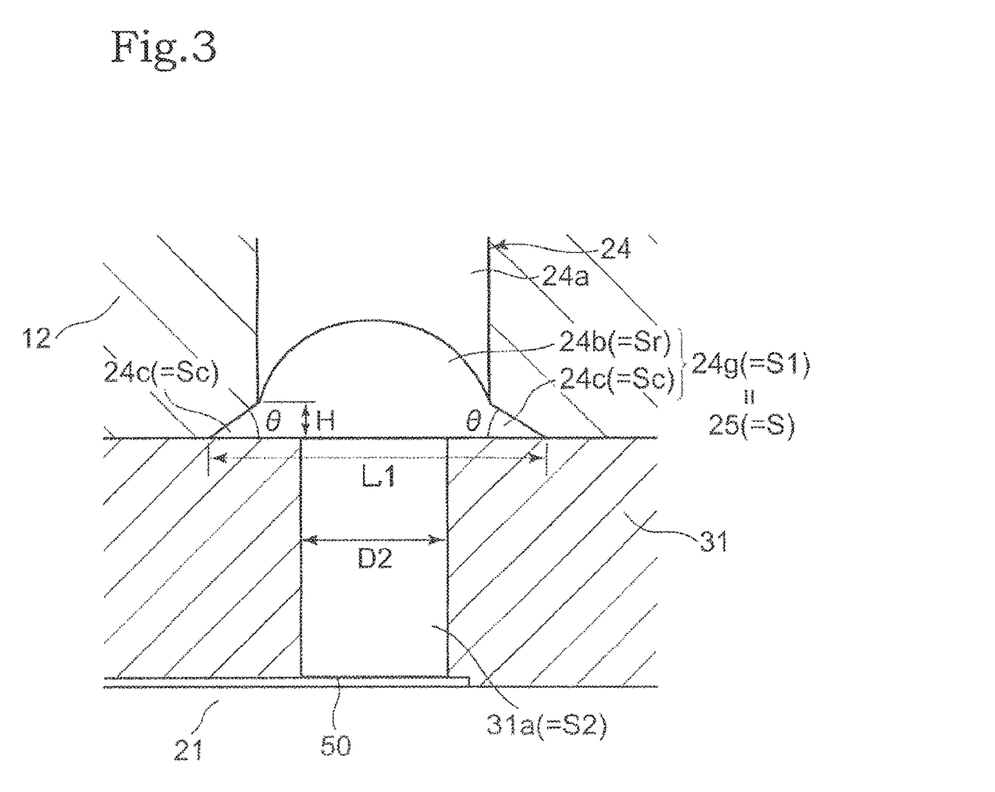
FIG. 3 is a view for describing an inner peripheral annular space which makes an atmosphere open hole and communication holes communicate with each other.

As shown in FIGS. 2 and 3, a ventilation gap 50 is disposed in a gap in the axial direction of the rotary shaft 21 between the visco-seal 32 of the first shaft seal portion 30 and the seal ring 42 of the second shaft seal portion 40. The ventilation gap 50 has a flow passage cross-sectional area larger than a shaft seal cross-sectional area of the air seal portion 60 in the direction orthogonal to the rotary shaft. The ventilation gap 50 which communicates with the respective communication holes 31a communicates with the atmosphere open passage 24 opened to an atmosphere. Accordingly, the ventilation gap 50 is opened to an atmosphere through the atmosphere open passage 24.

In manufacturing the casing 12 by casting, a tolerance attributed to casting is taken into consideration. In this case, as shown in FIG. 3, in the axial direction of the rotary shaft 21, a width L1 obtained by adding a width of the inner peripheral annular groove 24b and widths of the tapered expanding portions 24c disposed on both sides of the inner peripheral annular groove 24b (that is, a width of an opening portion of the inner peripheral annular space 24g) is set to a predetermined size slightly larger than an opening diameter D2 of the communication hole 31a. By taking into account a tolerance attributed to casting, the width L1 of the inner peripheral annular space 24g in the axial direction of the rotary shaft 21 is set slightly larger than the opening diameter D2 of the communication hole 31a by 3 mm or more, for example. Even when a tolerance which falls within a designed range is generated in the manufacture of the casing 12 by casting, the respective communication holes 31a never fail to overlap with the inner peripheral annular space 24g in the axial direction of the rotary shaft 21 and hence, the deviation of the rotary shaft 21 in the axial direction can be absorbed. Further, the inner peripheral annular space 24g on a casing 12 side and the respective communication holes 31a on a shaft seal device 20 side can be made to communicate with each other with certainty. In the manufacture of the casing 12 by casting, a cast-in hole can be used as the atmosphere open hole 24a. However, the atmosphere open hole 24a may be formed by machining. The inner peripheral annular groove 24b having an approximately semicircular shape can be simultaneously formed at the time of manufacturing the casing 12 by casting and hence, the number of man-hours for forming the inner peripheral annular groove 24b can be reduced.

During an unloading operation, the inside of the rotor chamber 15 assumes a negative pressure. The negative pressure performs an action of sucking a lubricant in the bearing 22 into the inside of the rotor chamber 15 through a gap formed between an outer peripheral surface of the rotary shaft 21 and an inner peripheral surface of the shaft seal device 20. In view of the above, the atmosphere open passage 24 which is opened to an atmosphere and the ventilation gap 50 are disposed so as to prevent a lubricant in the bearing 22 from flowing into the rotor chamber 15. However, due to a pressure loss generated in the atmosphere open passage 24 during an unloading operation, in an actual operation, a pressure in the ventilation gap 50 does not become an atmospheric pressure.

There is a possibility that a pressure loss is generated at various portions in the atmosphere open passage 24 ranging from the outside of the casing 12 (atmospheric side) to the ventilation gap 50. The present invention is intended to reduce a pressure loss at such portions by focusing on an open cross-sectional area S1 of the inner peripheral annular space 24g and a total open cross-sectional area S2 of the communication holes 31a. The atmosphere open hole 24a is formed such that a pressure loss in the atmosphere open hole 24a is smaller than a pressure loss in the inner peripheral annular space 24g and a pressure loss in the communication holes 31a.

Assuming an open cross-sectional area of the inner peripheral annular space 24g in partial cross section taken along the axial direction of the rotary shaft 21 as S1, a total open cross-sectional area of the communication holes 31a as S2, an open cross-sectional area of the i-th communication hole out of the communication holes 31a as S2i, and the number of communication holes 31a as n (n being a natural number of 1 or more), the following relationship is established.

$$S2 = S21 + S22 + \cdots + S2(n-1) + 2n = \sum_{i=1}^{n} S2i$$

Further, assume an open cross-sectional area of the inner peripheral annular groove 24b in partial cross section taken along the axial direction of the rotary shaft 21 as Sr and an open cross-sectional area of the tapered expanding portions 24c disposed on both sides of the inner peripheral annular groove 24b in partial cross section taken along the axial direction of the rotary shaft 21 as Sc. Since the inner peripheral annular space 24g is formed of the inner peripheral annular groove 24b and the tapered expanding portions 24c disposed on both sides of the inner peripheral annular groove 24b, the open cross-sectional area S1 of the inner peripheral annular space 24g is expressed as Sr+Sc.

Two O-rings 35, 46 are disposed in the shaft seal device 20 in a spaced-apart manner from each other in the axial direction of the rotary shaft 21. The restriction is imposed on the arrangement of the annular space 25 in the axial direction of the rotary shaft 21 due to such a spaced-apart distance between these two O-rings 35, 46. Further, the communication holes 31a are formed in the circumferential direction of the oil seal 31 and hence, the number n of the communication holes 31a can be easily increased. Accordingly, there is a tendency that a total open cross-sectional area S2 of the communication holes 31a is increased. Accordingly, a large pressure loss is generated in the annular space 25 rather than in n pieces of communication holes 31a.

In view of the above, the present invention has focused on a casing 12 side where the small restriction is imposed on the arrangement of the annular space 25 in the axial direction of the rotary shaft 21, and is characterized by arranging the inner peripheral annular space 24g which functions as the annular space 25 surrounding the shaft seal device 20 in the circumferential direction on a casing 12 side. With such arrangement, it is possible to properly ensure a width L1 of the inner peripheral annular space 24g in the axial direction of the rotary shaft 21 compared to the case where the annular space 25 is arranged on the shaft seal device 20 side.

As expressed in the following formula (1), the open cross-sectional area S1 of the inner peripheral annular space 24g (that is, the open cross-sectional area S of the annular space 25) is set larger than the total open cross-sectional area S2 of the communication holes 31a. With such setting of the open cross-sectional areas, a pressure loss in the inner peripheral annular space 24g (annular space 25) can be set smaller than a pressure loss in the communication holes 31a.

$$S1 \geqq S2 = \sum_{i=1}^{n} S2i \qquad (1)$$

Accordingly, a pressure loss in the inner peripheral annular space 24g which forms the annular space 25 can be reduced and hence, flowing-in of a lubricant during an unloading operation can be prevented.

Figure 4:
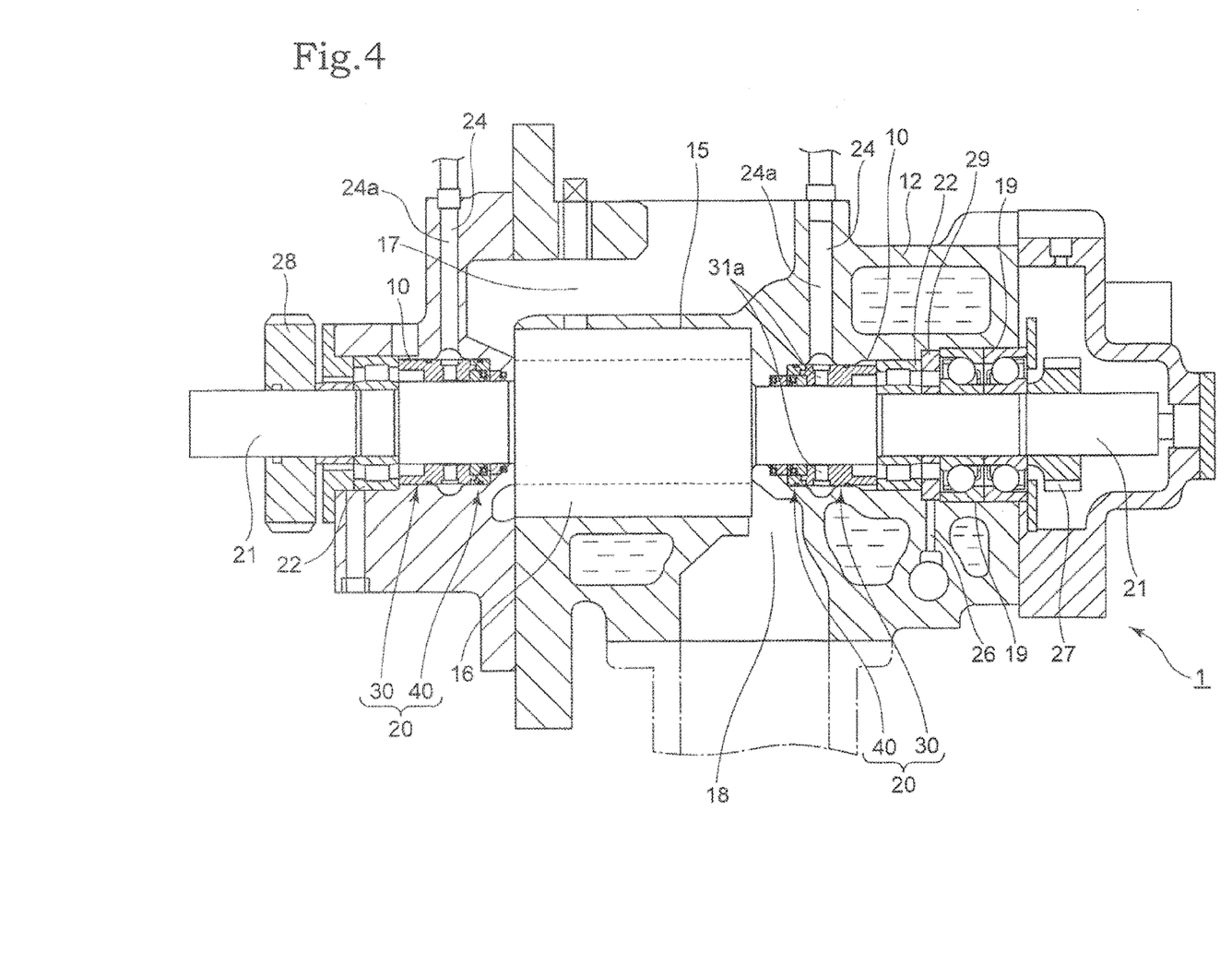
FIG. 4 is a longitudinal cross-sectional view showing the schematic configuration of an oil-free screw compressor according to a second embodiment of the present invention.

Next, a second embodiment of the present invention is described in detail with reference to FIGS. 4 to 6. In the second embodiment, constitutional elements having identical functions as the constitutional elements in the first embodiment described above are given the same symbols, and the repeated description of these constitutional elements is omitted.

An oil-free screw compressor 1 according to the second embodiment includes: a shaft seal device 20; and an inner peripheral annular space 24g and an outer peripheral annular space 31b which form a space 25 surrounding the shaft seal device 20 in the circumferential direction in a peripheral portion of the shaft seal device 20 (corresponding to "annular space" described in claims).

Figure 5:
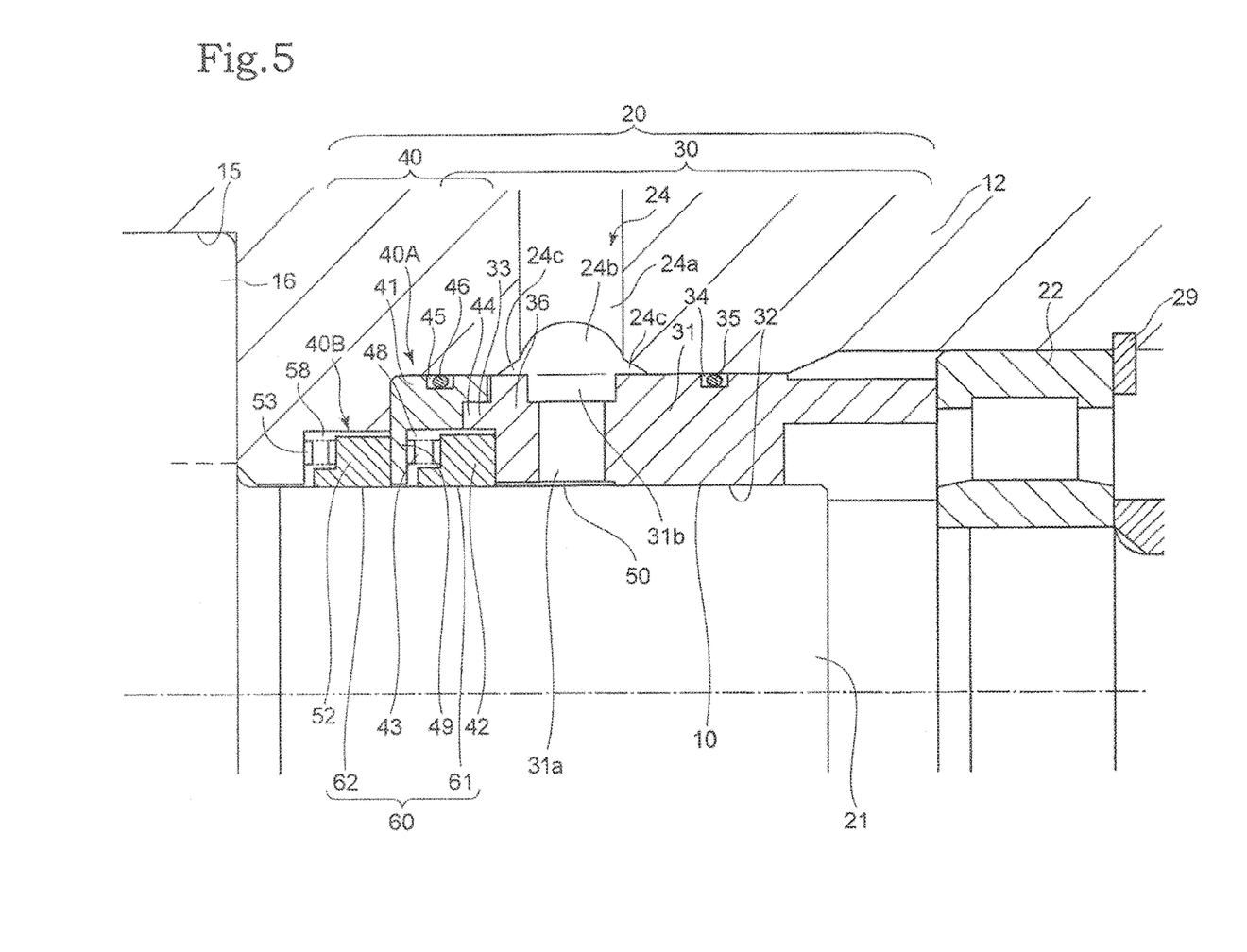
FIG. 5 is a partial cross-sectional view showing a shaft seal device and an area around the shaft seal device in the oil-free screw compressor shown in FIG. 4.
Figure 6:
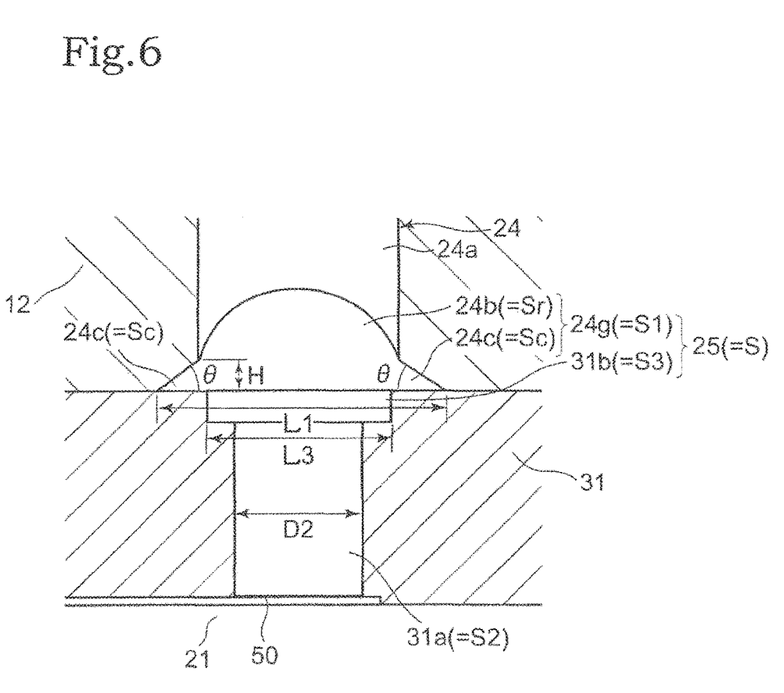
FIG. 6 is a view for describing an inner peripheral annular space and an outer peripheral annular space which make an atmosphere open hole and communication holes communicate with each other.

As shown in FIG. 5, the outer peripheral annular space 31b which forms a portion of the annular space 25 is formed on an outer peripheral side of an oil seal 31 of the shaft seal device 20. The outer peripheral annular space 31b is an annular groove formed on an outer peripheral surface of the shaft seal device 20 along the circumferential direction such that the outer peripheral annular space 31b faces the inner peripheral annular space 24g. The outer peripheral annular space 31b is formed by machining, for example. Although the shape of the outer peripheral annular space 31b is not limited, for example, the outer peripheral annular space 31b has a rectangular shape in partial cross section taken along the axial direction of the rotary shaft 21. A width L3 of an opening portion of the outer peripheral annular space 31b in the axial direction of the rotary shaft 21 is set equal to or larger than an opening diameter D2 of the communication hole 31a and smaller than a width L1 of an opening portion of the inner peripheral annular space 24g in the axial direction of the rotary shaft 21.

The respective communication holes 31a communicate with the outer peripheral annular space 31b and a ventilation gap 50. The ventilation gap 50 communicates with an atmosphere open hole 24a through the respective communication holes 31a and the outer peripheral annular space 31b on a shaft seal device 20 side and the inner peripheral annular space 24g on the casing 12 side. Accordingly, the communication holes 31a and the outer peripheral annular space 31b on the shaft seal device 20 side, and the inner peripheral annular space and the atmosphere open hole 24a on the casing 12 side communicate with an atmosphere thus forming an atmosphere open passage 24.

In the same manner as the above-mentioned first embodiment, in manufacturing a casing 12 by casting, a tolerance attributed to casting is taken into consideration. In this case, as shown in FIG. 6, in the axial direction of the rotary shaft 21, a width obtained by adding a width of the inner peripheral annular groove 24b and widths of tapered expanding portions 24c disposed on both sides of the inner peripheral annular groove 24b, that is, a width L1 of an opening portion of the inner peripheral annular space 24g, is set to a predetermined size slightly larger than a width L3 of an opening portion of the outer peripheral annular space 31b. By taking into account a tolerance attributed to casting, the width L1 of the open portion of the inner peripheral annular space 24g in the axial direction of the rotary shaft 21 is set slightly larger than the width L3 of the opening portion of the outer peripheral annular space 31b by 3 mm or more, for example. Even when a tolerance which falls within a designed range is generated in the manufacture of the casing 12 by casting, the opening portion of the outer peripheral annular space 31b never fails to overlap with the opening portion of the inner peripheral annular space 24g in the axial direction of the rotary shaft 21 and hence, the deviation of the rotary shaft 21 in the axial direction can be absorbed. Further, the inner peripheral annular space 24g on a casing 12 side and the outer peripheral annular space 31b on the shaft seal device 20 side can be made to communicate with each other with certainty.

In the second embodiment, the annular space 25 is formed of the inner peripheral annular space 24g on the casing 12 side and the outer peripheral annular space 31b on the shaft seal device 20 side. With such a configuration, the annular space 25 is formed on both sides, that is, on the casing 12 side and on the shaft seal device 20 side. Accordingly, compared to the case where the inner peripheral annular space 24g is formed only on the casing 12 side, an open cross-sectional area S1 of the inner peripheral annular space 24g can be made small so that it is possible to alleviate the restriction imposed on the arrangement of the inner peripheral annular space 24g on the casing 12 side. Accordingly, a degree of freedom in arranging the inner peripheral annular space 24g in the casing 12 can be increased.

In the same manner as the first embodiment described above, assume a total open cross-sectional area of the communication holes 31a as S2, an open cross-sectional area of the i-th communication hole out of the communication holes 31a as S2i, and the number of communication holes 31a as n (n being a natural number of 1 or more). As expressed by the following formula (2), an opening cross-sectional area S of the annular space 25 which is obtained by adding an open cross-sectional area S1 of the inner peripheral annular space 24g and an open cross-sectional area S3 of the outer peripheral annular space 31b is set larger than a total open cross-sectional area S2 of the communication holes 31a. With such setting of the open cross-sectional areas, a pressure loss in the inner peripheral annular space 24g and the outer peripheral annular space 31b (annular space 25) can be set smaller than a pressure loss in the communication holes 31a.

$$S = S1 + S3 \geq S2 = \sum_{i=1}^{n} S2i \quad (2)$$

Accordingly, a pressure loss in the inner peripheral annular space 24g and the outer peripheral annular space 31b which form the annular space 25 can be lowered and hence, flowing-in of a lubricant during an unloading operation can be prevented.

In the above-mentioned embodiment, the shaft seal device 20 on a discharge side has been described. However, the present invention is also applicable to the shaft seal device 20 on a suction side. The structure of the second shaft seal portion 40 in the shaft seal device 20 is not limited to the above-mentioned embodiment. The number of air seal portions and the directions of seal rings can be changed as desired. As the second shaft seal portion 40, a known seal member such as a labyrinth seal can also be used in place of the seal ring 42, 52. As the oil seal portion 32 of the first shaft seal portion 30, the so-called visco-seal 32 is exemplified. However, a known seal structure such as a labyrinth seal can also be used.

In the above-mentioned embodiment, the oil seal 31 and the packing case 41 are respectively formed of a unitary member. However, provided that the oil seal 31 and the packing case 41 have the integral configuration at the time of assembling the oil seal 31 and the packing case 41, the oil seal 31 and the packing case 41 may be respectively formed of two or more members split in the axial direction of the rotary shaft 21. The oil seal 31 may be formed of an oil seal portion 32 and a body portion which supports the oil seal portion 32 thereon. A surface of the rotary shaft 21 may be formed of a base material of the rotary shaft 21 per se or may be formed of any one of various films applied to a surface of the base material. The mode of the rotary shaft 21 according to the present invention includes a mode where the rotary shaft 21 is used in a single form or a mode where a sleeve not shown in the drawing is fixed to an outer peripheral surface side of the rotary shaft 21.

As described above, to exemplify the technical feature of this disclosure as an example, the above-mentioned embodiment has been described, and the accompanying drawings and the detailed description are provided for describing the embodiment.

Therefore, the constitutional elements described in the accompanying drawings and the detailed description include not only constitutional elements which are indispensable for solving the problems of the present invention but also constitutional elements which are not indispensable for solving the problems of the present invention and are provided for exemplifying the above-mentioned technique. Accordingly, it should not be construed that the fact that constitutional elements which are not indispensable for solving the problems of the present invention are described in accompanying drawings and the detailed description readily verifies that the constitutional elements which are not indispensable for solving the problems of the present invention are also included in the constitutional elements which are indispensable for solving the problems of the present invention.

Although this disclosure has been sufficiently described in conjunction with the preferred embodiment with reference to accompanying drawings, it is apparent for those who are skilled in the art that various modifications and variations can be made based on this disclosure. It should be construed that such modifications and variations are also embraced by the present invention so long as such modifications and variations fall within the scope of the invention called for in claims.

As can be clearly understood from the description made heretofore, in the oil-free screw compressor 1 according to the present invention, the annular space 25 which is a space surrounding the shaft seal device 20 in the circumferential direction includes the inner peripheral annular space 24g annularly formed on an inner peripheral side of the casing 12. Assuming an open cross-sectional area of the inner peripheral annular space 24g in a partial cross section taken along an axial direction of the rotary shaft 21 as S1, assuming an open cross-sectional area of one communication hole 31a as S2, and assuming the number of communication holes 31a as n, S1≥n×S2 is satisfied. With such a configuration, the inner peripheral annular space 24g which forms the annular space 25 is formed on a casing 12 side and hence, it is possible to alleviate the restriction imposed to ensure a width L1 of the opening portion of the inner peripheral annular space 24g in the axial direction of the rotary shaft 21. Accordingly, the open cross-sectional area S1 of the inner peripheral annular space 24g can be increased compared to the case where the annular space 25 is formed on a shaft seal device 20 side. As a result, S1≥n×S2 is easily satisfied and hence, a pressure loss in the annular space 25 can be reduced whereby flowing-in of a lubricant during an unloading operation can be prevented.

The present invention has the following technical feature in addition to the above-mentioned technical feature.

That is, the annular space 25 which is a space surrounding the shaft seal device 20 in the circumferential direction further includes the outer peripheral annular space 31b which is disposed so as to opposedly face the inner peripheral annular space 24g on an outer peripheral side of the shaft seal device 20, and has a larger width in the axial direction of the rotary shaft 21 than the communication holes 31a, and assuming an open cross-sectional area of the outer peripheral annular space 31b in a partial cross section taken along the axial direction of the rotary shaft 21 as S3, S1+S3≥n×S2 is satisfied. With such a configuration, the annular space 25 is formed on both on a casing 12 side and on a shaft seal device 20 side and hence, compared to the case where the inner peripheral annular space 24g is formed only on the casing 12 side, the open cross-sectional area S1 of the inner peripheral annular space 24g can be made small so that it is possible to alleviate the restriction imposed on the arrangement of the inner peripheral annular space 24g on the casing 12 side. Accordingly, a degree of freedom in arranging the inner peripheral annular space 24g in the casing 12 can be increased.

The casing 12 is formed of a cast product, and a width L1 of the opening portion of the inner peripheral annular space 24g in the axial direction of the rotary shaft 21 is larger than an opening diameter D2 of the communication hole 31a by an amount set by taking into account a manufacturing tolerance of the cast product. With such a configuration, even when a tolerance which falls within a designed range is generated in the manufacture of the casing 12 by casting, the respective communication holes 31a never fail to overlap with the inner peripheral annular space 24g in the axial direction of the rotary shaft 21 and hence, the deviation of the rotary shaft 21 in the axial direction can be absorbed.

The casing 12 is formed of a cast product, and a width L1 of the opening portion of the inner peripheral annular space 24g in the axial direction of the rotary shaft 21 is larger than a width L3 of the opening portion of the outer peripheral annular space 31b in the axial direction of the rotary shaft 21 by an amount set by taking into account a manufacturing tolerance of the cast product. With such a configuration, even when a tolerance which falls within a designed range is generated in the manufacture of the casing 12 by casting, the outer peripheral annular space 31b never fails to overlap with the inner peripheral annular space 24g in the axial direction of the rotary shaft 21 and hence, the deviation of the rotary shaft 21 in the axial direction can be absorbed.

The casing 12 is formed of a cast product. The inner peripheral annular space 24g has: the inner peripheral annular groove 24b; and the tapered expanding portions 24c having a tapered shape which are formed on both end sides of the inner peripheral annular groove 24b in the axial direction of the rotary shaft 21. The inner peripheral annular groove 24b has an approximately semicircular shape in partial cross section taken along the axial direction of the rotary shaft 21. With such a configuration, the inner peripheral annular groove 24b can be simultaneously formed at the time of manufacturing the casing 12 by casting and hence, the number of man-hours for forming the inner peripheral annular groove 24b can be reduced.

The tapered expanding portions 24c respectively have an inclination angle θ and a height H set by taking into account projecting heights of the O-rings 35, 46 mounted on an outer peripheral side of the shaft seal device 20. With such a configuration, the O-rings 35, 46 disposed in the recessed portions 34, 45 of the shaft seal device 20 are not damaged at the time of loading the shaft seal device 20 in the shaft seal device loading space 10 or at the time of unloading the shaft seal device 20 from the shaft seal device loading space 10.

The invention claimed is:

1. An oil-free screw compressor comprising:
a pair of female and male screw rotors which meshes with each other in a non-contact manner;
a casing having a rotor chamber in which the screw rotors are housed;
a bearing which supports rotary shafts of the screw rotors;
a shaft seal device which includes an oil seal portion disposed on a bearing side and an air seal portion disposed on a rotor chamber side and shaft-seals the rotary shafts;
an atmosphere open hole which is formed in the casing;
at least one communication hole which is formed in the shaft seal device in a state where the communication hole is positioned between the oil seal portion and the air seal portion; and
an annular space which makes the atmosphere open hole and the at least one communication hole communicate with each other, wherein
the annular space includes an inner peripheral annular space annularly formed on an inner peripheral side of the casing,
wherein an open cross-sectional area of the inner peripheral annular space in a partial cross section taken along an axial direction of the rotary shaft as S1, a total open cross-sectional area of the communication holes as S2, an open cross-sectional area of the i-th communication hole out of the communication holes as S2i, and a number of communication holes as n (n being a natural number of 1 or more), a following relationship is satisfied:

$$S1 \geq S2 = \sum_{i=1}^{n} S2i$$

wherein the casing is formed of a cast product, and
a width of an opening portion of the inner peripheral annular space in the axial direction of the rotary shaft is larger than an opening diameter of the communication hole by an amount set by taking into account a manufacturing tolerance of the cast product.

2. The oil-free screw compressor according to claim 1, wherein the annular space further includes an outer peripheral annular space which is disposed so as to opposedly face the inner peripheral annular space on an outer peripheral side of the shaft seal device, and has a larger width in the axial direction of the rotary shaft than the communication holes, and wherein an open cross-sectional area of the outer peripheral annular space in a partial cross section taken along the axial direction of the rotary shaft as S3, a following relationship is satisfied $$S = S1 + S3 \geq S2 = \sum_{i=1}^{n} S2i.$$

3. The oil-free screw compressor according to claim 2, wherein the casing is formed of a cast product, and a width of an opening portion of the inner peripheral annular space in the axial direction of the rotary shaft is larger than a width of an opening portion of the outer peripheral annular space in the axial direction of the rotary shaft by an amount set by taking into account a manufacturing tolerance of the cast product.

4. The oil-free screw compressor according to claim 3, wherein the casing is formed of a cast product, the inner peripheral annular space has: an inner peripheral annular groove; and tapered expanding portions having a tapered shape which are formed on both end sides of the inner peripheral annular groove in the axial direction of the rotary shaft, and the inner peripheral annular groove has an approximately semicircular shape in partial cross section taken along the axial direction of the rotary shaft.

5. The oil-free screw compressor according to claim 4, wherein the tapered expanding portions respectively have an inclination angle and a height set by taking into account a projecting height of an O-ring mounted on an outer peripheral side of the shaft seal device.

6. The oil-free screw compressor according to claim 2, wherein the casing is formed of a cast product, the inner peripheral annular space has: an inner peripheral annular groove; and tapered expanding portions having a tapered shape which are formed on both end sides of the inner peripheral annular groove in the axial direction of the rotary shaft, and the inner peripheral annular groove has an approximately semicircular shape in partial cross section taken along the axial direction of the rotary shaft.

7. The oil-free screw compressor according to claim 6, wherein the tapered expanding portions respectively have an inclination angle and a height set by taking into account a projecting height of an O-ring mounted on an outer peripheral side of the shaft seal device.

8. The oil-free screw compressor according to claim 1, wherein the casing is formed of a cast product, the inner peripheral annular space has: an inner peripheral annular groove; and tapered expanding portions having a tapered shape which are formed on both end sides of the inner peripheral annular groove in the axial direction of the rotary shaft, and the inner peripheral annular groove has an approximately semicircular shape in partial cross section taken along the axial direction of the rotary shaft.

9. The oil-free screw compressor according to claim 8, wherein the tapered expanding portions respectively have an inclination angle and a height set by taking into account a projecting height of an O-ring mounted on an outer peripheral side of the shaft seal device.

10. The oil-free screw compressor according to claim 1, wherein the casing is formed of a cast product, the inner peripheral annular space has: an inner peripheral annular groove; and tapered expanding portions having a tapered shape which are formed on both end sides of the inner peripheral annular groove in the axial direction of the rotary shaft, and the inner peripheral annular groove has an approximately semicircular shape in partial cross section taken along the axial direction of the rotary shaft.

11. The oil-free screw compressor according to claim 10, wherein the tapered expanding portions respectively have an inclination angle and a height set by taking into account a projecting height of an O-ring mounted on an outer peripheral side of the shaft seal device.

* * * * *